United States Patent [19]
Daniel

[11] Patent Number: 5,413,464
[45] Date of Patent: May 9, 1995

[54] PROPULSION DEVICE HAVING CIRCULAR ARRAY OF INCLINED AIRFOIL ELEMENTS WITH RADIALLY-INWARDLY DIRECTED VACUUM-INDUCING SURFACES

[75] Inventor: William H. Daniel, Rogers, Ark.

[73] Assignee: LCD, Inc., Rogers, Ark.

[21] Appl. No.: 186,843

[22] Filed: Jan. 27, 1994

[51] Int. Cl.⁶ .............................................. F04D 29/34
[52] U.S. Cl. ..................................... 416/182; 416/185
[58] Field of Search ................ 416/179, 182, 185, 194, 416/195

[56] References Cited

U.S. PATENT DOCUMENTS

| | | |
|---|---|---|
| 509,142 | 11/1893 | Smith . |
| 589,946 | 9/1897 | Grunow ............................ 416/182 |
| 596,553 | 1/1898 | Sörensén ........................... 416/194 |
| 988,523 | 4/1911 | Toles . |
| 1,973,266 | 9/1934 | Perry ................................. 416/185 |
| 2,298,021 | 10/1942 | Presser . |
| 2,954,614 | 10/1960 | Vogt ................................. 416/179 |
| 3,051,072 | 8/1962 | Bohanon . |
| 3,261,297 | 7/1966 | Daniel . |
| 3,734,640 | 5/1973 | Daniel . |
| 5,102,066 | 4/1992 | Daniel . |
| 5,104,541 | 4/1992 | Daniel . |
| 5,137,424 | 8/1992 | Daniel . |
| 5,213,474 | 5/1993 | Daniel . |

FOREIGN PATENT DOCUMENTS

| | | |
|---|---|---|
| 1805 | 9/1895 | Denmark . |
| 694143 | 9/1965 | Italy . |
| 20786 | of 1911 | United Kingdom . |
| 1009403 | 11/1965 | United Kingdom ................ 416/194 |

*Primary Examiner*—Edward K. Look
*Assistant Examiner*—Mark Sgantzos
*Attorney, Agent, or Firm*—Young & Thompson

[57] ABSTRACT

A propulsion device comprises a circular series of inclined airfoil elements. Each airfoil element is connected along its lower side to a rigid plate member, which is adapted to be rotated at high speed via a motor output shaft. The airfoil elements are oriented on the plate such that their vacuum-inducing surfaces face upwardly and inwardly of the circular series, and their pressure surfaces face downwardly and outwardly of the circular series.

8 Claims, 1 Drawing Sheet

PROPULSION DEVICE HAVING CIRCULAR ARRAY OF INCLINED AIRFOIL ELEMENTS WITH RADIALLY-INWARDLY DIRECTED VACUUM-INDUCING SURFACES

BACKGROUND OF THE INVENTION

1. Field of the Invention

The present invention relates to propulsion devices, and more particularly to a device in which a novel configuration of airfoil elements is provided, in an inclined circular array.

2. Description of the Prior Art

In U.S. Pat. Nos. 5,137,424 and 5,213,474 of the present inventor, the discovery of important fluid dynamic principles has been embodied in various pump designs, to improve the movement of a fluid through a body. Similarly, in the present inventor's U.S. Pat. No. 5,104,541, which issued from a divisional application of the above-mentioned U.S. Pat. No. 5,137,424, the fluid dynamic principles are embodied in an oil-water separator. In the present application, these principles are embodied somewhat differently, to improve the movement of a body through a fluid.

More directly, the present invention constitutes an improvement on and a departure from the VTOL craft described in the present inventor's earlier U.S. Pat. No. 5,102,066. In that patent, a propeller unit comprising a circular series of horizontally-disposed airfoil elements was mounted on a double-shell structure, such that the airfoil elements occupied the annular space defined by the bottoms of the twin shells.

It has now been recognized, however, that the VTOL of the inventor's earlier patent described above has the disadvantage that the vacuum created within the double-shell structure creates not only a lift on the underside of the craft, but also a downward force on the upper surfaces of the double-shell structure, which tends to neutralize the lift.

SUMMARY OF THE INVENTION

The present invention thus provides a new type of propulsion device in which the inventor's airfoil principles are more successfully embodied, in a manner that the propulsion induced on a craft embodying the device is not counteracted by undesired opposing forces. In particular, the present invention relates to a propulsion device in which the propeller structure comprises a circular series of inclined airfoil elements, with the vacuum surfaces of the airfoil elements facing inwardly and upwardly of the series, and the pressure sides of the airfoil elements facing downwardly and outwardly of the series.

As noted above, the airfoil elements are arranged in a circular series, and moreover are joined by a rigid plate member at that side of the airfoil elements where the leading and trailing edges converge. The plate member is in turn connected to the output shaft of a motor confined within a motor housing. The output shaft of the motor is coaxial with the circular series of airfoil vanes, and so as to rotate the circular series of vanes at a high speed in a predetermined direction of rotation.

The downwardly and outwardly directed pressure surfaces of the airfoil vanes together define interrupted segments of a conical section, such that during rotation of the propulsion device, the rapidly rotating series of vanes appears to be an inverted truncated cone.

As each of the airfoil elements is moved through air or water upon rotation of the propeller structure, there is created a reduced pressure on its upwardly inwardly directed surface, and a higher pressure on its downwardly and outwardly directed surface, as is known in the art for conventional airfoils. Within the structure according to the invention, the lower pressure regions on the inner surfaces of the airfoil elements serve to generate a region of reduced pressure within the circular series of vanes and above the propeller structure, such that the propulsion device, and any craft to which it is attached, tends to be displaced axially of the motor shaft, toward the region of induced vacuum.

BRIEF DESCRIPTION OF THE DRAWINGS

The invention will now be explained in greater detail with reference to the accompanying drawings, which show a preferred embodiment according to the invention, and in which.

DETAILED DESCRIPTION OF PREFERRED EMBODIMENTS

Figure 1:
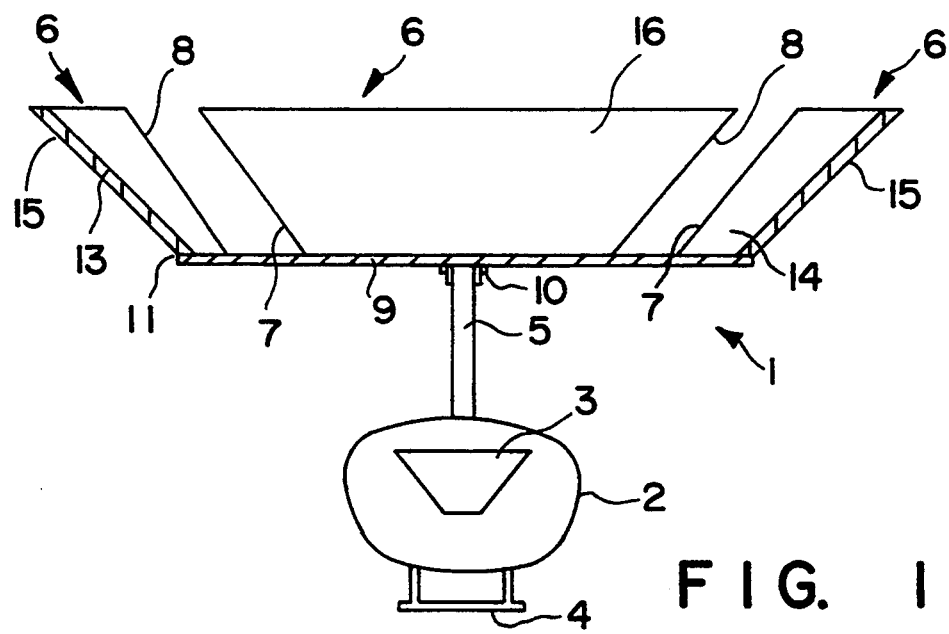
FIG. 1 is an axial section through a propulsion device according to a preferred embodiment of the invention.

Referring now to FIG. 1 of the drawings, shown therein is a propulsion device according to a preferred embodiment of the invention, designated generally as 1. The device 1 comprises a lower motor housing 2, which contains a motor or other prime mover shown schematically at 3. The motor housing 2 comprises a bracket 4 by which the propulsion device may be mounted to an aircraft or marine or submarine vessel.

As also shown in FIG. 1, the motor 3 comprises an output shaft 5 extending upwardly from the housing 2. The motor shaft 5 may be driven directly by motor 3, or by suitable transmission gearing not shown.

Figure 2:
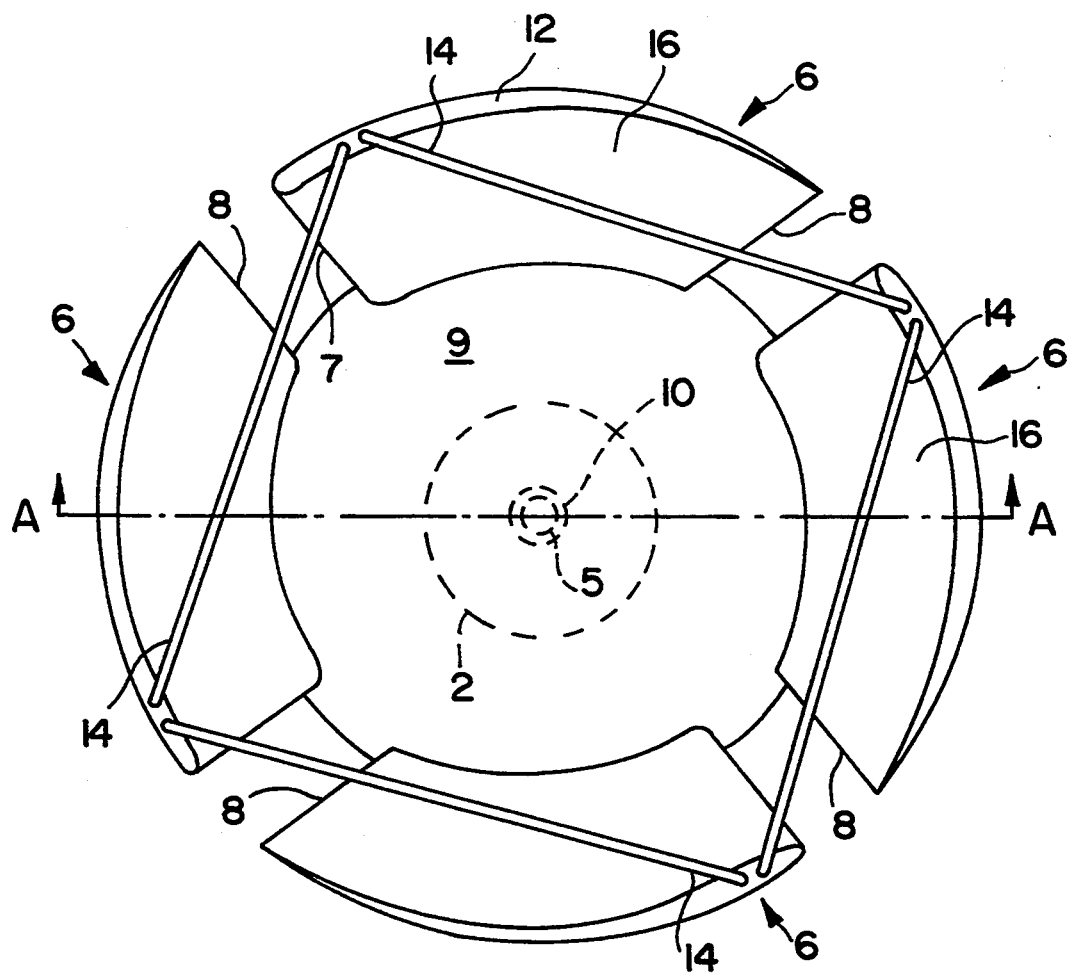
FIG. 2 is a plan view of the propulsion device of FIG. 1, the sectional view of FIG. 1 having been taken along the line A—A of FIG. 2.

As shown in FIG. 2, the propeller structure of the propulsion device according to the invention comprises a circular series of airfoil elements 6, arranged such that they all face in the same direction about a circle. In particular, each of the airfoil elements comprises a leading edge 7 and a trailing edge 8, such that the propeller assembly according to the invention would be rotated counterclockwise as viewed in FIG. 2.

Of course, the FIG. 2 depiction of counterclockwise rotation is arbitrary, in the sense that a mirror image of the FIG. 2 structure, which would therefore rotate in the clockwise direction, would be equally as effective. Indeed, on aircraft or marine or submarine vessels where it is desired to position at least one of the propulsion devices according to the invention on each side of the craft, it would be useful to have the port devices rotating clockwise, and the starboard devices rotating counterclockwise, or vice versa, thereby to counteract torque developed by the individual devices.

The airfoil elements 6 are connected to the motor output shaft 5 via a rigid plate 9 and a mounting bracket 10.

FIG. 2 shows plate 9 as an imperforate disc. However, it is possible to form openings in plate 9 for the purpose of reducing its weight, provided only that such openings, when disc 9 is rotated, do not significantly disrupt the intended action of the airfoil elements 6. Likewise, it is possible to form disc 9 as an annular member having a relatively large central opening, in which case a hub member with radially diverging spokes would be needed to interconnect motor shaft 5 and plate 9.

The airfoil elements 6 according to the invention may be constructed as shown in the inventor's earlier U.S. Pat. No. 3,734,640, the entirety of which patent is hereby expressly incorporated by reference. In that patent, it was found that by securing similarly shaped airfoil elements to a rigid plate, at that side of the airfoils where the leading and trailing edges diverge, an improved rotor could be produced for a centrifugal pump having a correspondingly shaped housing.

In the present invention, it has been most surprisingly discovered that, by mounting similarly-shaped airfoil elements to a rigid rotary plate, at that side of the airfoil elements where the leading and trailing edges converge, a propulsion device is created that generates a powerful vacuum force tending to displace the propulsion device toward the vacuum, axially of the motor shaft and toward the base of the truncated cone described by the circular series of airfoil elements.

Although the number of airfoil elements 6 is four in this embodiment, it will be appreciated that the number of airfoil elements may be varied at will as a design consideration, from a minimum of two up to a maximum of any desired number. In practice, the propeller assembly will ordinarily have at least three airfoil elements 6. Moreover, the fewer airfoil elements 6, the greater will be their arcuate extent, as a general rule.

FIG. 1 shows that the lower side 11 of each airfoil element is secured to the periphery of disc 9, by a suitable securing means such as bolts, not shown.

Although FIG. 1 shows motor 3 disposed below disc 9, it will be appreciated that the motor 3 is not necessarily so disposed. Instead, it can be positioned above disc 9, provided its position does not disrupt generation of vacuum radially inwardly of the airfoil elements 6. Likewise, by use of one or more universal joints, the motor could be positioned to the side of the propeller structure, with reference to the orientation shown in FIG. 1.

As the disc 9 is rotated at high speed by shaft 5, the circular series of airfoil vanes 6 will be subject to strong centrifugal forces. Thus, to prevent the propeller structure from flying apart, it is preferred to provide some connection means at the upper sides 12 of the airfoil elements. FIG. 2 shows such means in the form of connecting rods 14 which are attached the upper sides 12 of the airfoil elements, in the vicinity of the leading edges 7 of the airfoil elements, where it is contemplated that the centrifugal forces will be greatest.

Depending on the application of the propulsion device according to the invention, the braces exemplified by connecting rods 14 may or may not be necessary. Where they are considered desirable or necessary, they need not necessarily be attached as shown in FIG. 2. Instead, braces can be attached to the airfoil element 6 in the most propitious location, as will be apparent to those skilled in the art, taking into account the considerations of balance, strength and excess weight.

Each of the airfoil elements 6 comprises a vacuum surface 16 which, as shown in FIGS. 1 and 2, is directed inwardly and upwardly of the overall propeller structure.

Similarly, each airfoil element 6 comprises a pressure surface 15, on the side of the airfoil element opposite the vacuum surface 16, which pressure surface 15 is directed downwardly and outwardly of the circular series of airfoil elements 6.

Although the pressure surfaces 15 of the airfoil elements 6 are not fully visible in FIGS. 1 and 2, it will be appreciated that the surfaces 15 collectively describe a cone that is coaxial with the output shaft 5 of motor 3.

It will be appreciated that the airfoil sections 6 according to the invention can usefully be adapted from the airfoil elements described in greater detail in the present inventor's earlier U.S. Pat. No. 3,734,640, as discussed above.

As shown in FIG. 5 and described at column 2, lines 22-56 of that patent, each of the airfoil sections has a region of greatest thickness disposed substantially nearer to the leading edge of the element than the trailing edge, and the radially-inwardly directed surfaces of the elements traverse the entire radial extent or thickness of the vane, from the region of greatest thickness to the trailing edge.

In operation, the motor 3 of propulsion device 1 is actuated by an operator of the aircraft or marine vessel to which the device 1 is attached, whereupon the output shaft 5 is caused to rotate at high velocity. This in turn causes rotation of the disc 9 and attached airfoil elements 6, via connection 10, in the counterclockwise direction as shown in FIG. 2.

As air or water passes across the rotating series of airfoil elements 6, regions of reduced pressure are generated in the vicinity of the vacuum surfaces 16, which reduced pressure is lower than the pressure existing on the pressure surfaces 15. As the pressure surfaces 15 are directed downwardly and outwardly of the overall propeller structure, the region of vacuum generated within the cup-shaped shape defined by airfoil elements 6 and disc 9, induces the propulsion device and the craft to which it is attached to move upwardly, with reference to FIG. 1, or forwardly, if the propulsion device is positioned with plate 9 perpendicular to the horizontal.

In this regard, it has been found that the inclined orientation of the airfoil element 6 according to the invention provides much better propulsion characteristics than would a series of horizontally disposed airfoil elements, because in the case of inclined elements the generated reduced pressure is more or less confined within the conical region described by the rotating series of vanes. Moreover, in addition to the vertically upward lift/propulsion components acting on pressure surfaces 15, it has been found that the high pressure acting laterally on surfaces 15 produces a "squeezing", or compression, effect on the conical propeller assembly, which also contributes to the upward displacement of the device 1, with reference to FIG. 1.

Accordingly, it will be appreciated that the airfoil elements 6 according to the invention should be neither horizontally nor vertically disposed, but rather should be inclined in an intermediate oblique position. In the embodiment described, the airfoil elements 6 are inclined at an angle of about 45°, as shown in FIG. 1; however, it will be appreciated that this angle can be varied to vary the propulsion characteristics of the device, as a matter of routine optimization. For example, it is contemplated that an inclination angle for the airfoil element 6 of about 30° relative to the horizontal, will produce desirable propulsion characteristics.

FIG. 2 shows each of the airfoil elements 6 with an approximately 0° angle of attack. That is, the leading edge 7 of each airfoil element is disposed at about the same radial distance from the center of disc 9 as its respective trailing edge 8. According to the invention, it is also to be understood that each airfoil element 6 may be fixed in a predetermined position such that the nose of each element, comprising leading edge 7, is positioned more radially inwardly of its respective trailing edge 8, as shown in FIG. 5 of U.S. Pat. No. 3,734,640. This will serve to give the airfoil elements 6 a positive angle of attack. The degree of the positive angle of attack, departing from the 0 angle shown in FIG. 2, may be varied as a matter of routine design consideration by those skilled in the art, to produce the most desirable lift/propulsion characteristics for the particular application of the invention.

It will also be appreciated by those skilled in the art that the various structural components depicted in FIGS. 1 and 2 may advantageously be formed from aluminum or other suitable aircraft-grade materials, or suitable materials for fabrication of marine or submarine vessels, and that the choice of materials will be dictated by the particular application of the propulsion device built according to the invention.

While the present invention has been described in connection with various preferred embodiments thereof, it will be understood by those skilled in the art that these embodiments have been given solely for purposes of illustration, and should not be construed as limiting in anyway the true scope and spirit of the invention as set forth in the appending claims.

What is claimed is:

1. A propulsion device comprising a circular series of airfoil elements, each airfoil element comprising a leading edge, a trailing edge, and a pair of generally parallel upper and lower edges interconnecting said leading edge and trailing edge, each airfoil element being mounted via its lower edge to a rigid interconnecting member, each airfoil element having a pressure surface and an opposed vacuum-inducing surface, said airfoil elements being inclined such that the vacuum-inducing surfaces of the airfoil elements face upwardly and inwardly of said circular series, and the pressure surfaces of said airfoil elements face downwardly and outwardly of the circular series, each airfoil element having a region of greatest thickness located substantially nearer its leading edge than its trailing edge, and each said vacuum-inducing surface traversing the entire radial extent of its airfoil element from said region of greatest thickness to said trailing edge, said leading and trailing edges of each airfoil element converging toward said lower edge and diverging toward said upper edge; said circular series of airfoil elements and said interconnecting member collectively describing a generally cup-shaped structure being open at the upper edges of said airfoil elements; and a motor output shaft being centrally attached to said rigid interconnecting member and extending perpendicularly therefrom.

2. The propulsion device according to claim 1, wherein each of said airfoil elements is inclined relative to said plate member at an angle of about 45°.

3. The propulsion device according to claim 1, wherein each of said airfoil elements is inclined relative to said plate member at an angle of about 30°.

4. The propulsion device according to claim 1, wherein said rigid plate is an imperforate circular disc.

5. The propulsion device according to claim 1, further comprising bracing members interconnecting adjacent airfoil elements in said circular series.

6. The propulsion device according to claim 5, wherein said bracing members are rod-shaped elements attached to said upper edges of said airfoil elements.

7. The propulsion device according to claim 1, wherein the leading edge of each airfoil element is disposed radially outwardly of said circular series at about the same distance as its respective trailing edge.

8. The propulsion device according to claim 1, wherein the leading edge of each airfoil element is positioned radially outwardly of said circular series at a distance less than its respective trailing edge.

* * * * *